United States Patent

[11] 3,624,013

[72] Inventors Kazys Sekmakas
Chicago;
Edward A. Gauger, Jr., Chicago; Lester A. Henning, Arlington Heights, all of Ill.
[21] Appl. No. 615,048
[22] Filed Feb. 10, 1967
[45] Patented Nov. 30, 1971
[73] Assignee DeSoto, Inc.

[54] HEAT-HARDENABLE WATER-DISPERSIBLE RESINS DERIVED FROM POLYHYDRIC POLYETHERS AND MIXTURES THEREOF WITH BENZOGUANAMINE-FORMALDEHYDE CONDENSATES PARTICULARLY ADAPTED FOR ELECTRODEPOSITION
20 Claims, No Drawings

[52] U.S. Cl. .................................................. 260/18,
260/21, 260/22, 260/29.2, 260/29.4, 204/181
[51] Int. Cl. .....................................................C08g 17/007,
C08g 17/16, C08g 37/34
[50] Field of Search............................................. 260/18 CL,
18 EP, 22 EP, 22 T, 21, 29.2, 29.4, 29.2 EP;
204/181

[56] References Cited
UNITED STATES PATENTS

| | | | |
|---|---|---|---|
| 3,392,129 | 7/1968 | Hoy et al. ...................... | 260/22 |
| 3,376,273 | 4/1968 | Masters et al. ................. | 260/18 UX |
| 3,355,401 | 11/1967 | Tanner............................ | 260/18 |
| 3,308,077 | 3/1967 | Pattison et al. ................. | 260/18 X |
| 3,293,201 | 12/1966 | Shahade et al.................. | 260/18 X |
| 3,369,983 | 2/1968 | Hart et al....................... | 260/18 X |
| 3,340,172 | 9/1967 | Huggard........................ | 260/18 X |
| 3,275,583 | 9/1966 | Kloos ............................ | 260/22 |
| 3,141,897 | 7/1964 | Crecelius....................... | 260/404.8 |
| 2,933,468 | 4/1960 | Aldridge et al. ............... | 260/29.2 |
| 3,070,256 | 12/1962 | Bremmer....................... | 260/18 X |
| 3,310,512 | 3/1967 | Curtice.......................... | 260/75 |
| 3,448,017 | 3/1969 | Chang et al.................... | 204/181 |
| 3,091,612 | 5/1963 | Stephens....................... | 260/29.4 X |
| 3,207,715 | 9/1965 | Stephens....................... | 260/29.4 X |

FOREIGN PATENTS

| | | | |
|---|---|---|---|
| 6,409,137 | 2/1966 | Netherlands.................. | 260/22 EP |
| 663,219 | 8/1965 | Belgium ........................ | |

OTHER REFERENCES

Paint Oil and Color Journal; Jan. 27, 1967; " Water-Soluble Epoxy Esters"; Tysall, pages 177– 8.

*Primary Examiner*—Donald E Czaja
*Assistant Examiner*—C. Warren Ivy
*Attorney*—Dressler, Goldsmith, Clement & Gordon ABSTRACT: Aqueous dispersions especially adapted to be electrodeposited at the anode to form corrosion resistant coatings after baking to cure the same are formulated based on water-dispersible condensation resins which are formed by esterifying a first part of the hydroxy functionality of a linear polyhydric polyether with a monocarboxylic acid such as a drying oil fatty acid. A second part of the hydroxy functionality is then consumed by reaction with a monoanhydride such as trimellitic anhydride providing a polycarboxylic intermediate which is reacted with a monoepoxide such as ethylene oxide, propylene oxide, butylene oxide or a glycidyl ester of a tertiary carboxylic acid to reduce the acid number to a value below 50 and to generate hydroxy functionality remote from the linear backbone of the polyether. The condensation resin is dispersed in water with the aid of a small amount of nitrogenous base, such as ammonia or an amine and the dispersed resin is heat-hardening per se. Cure is preferably effected using a water dispersible and nonwater-soluble heat-hardening benzoguanamine-formaldehyde resin which deposits in direct proportion to its concentration and which increases the resistivity of the film which is deposited to provide an opportunity for limiting film thickness at the voltage selected for electrodeposition.

HEAT-HARDENABLE WATER-DISPERSIBLE RESINS DERIVED FROM POLYHYDRIC POLYETHERS AND MIXTURES THEREOF WITH BENZOGUANAMINE-FORMALDEHYDE CONDENSATES PARTICULARLY ADAPTED FOR ELECTRODEPOSITION

The present invention relates to aqueous colloidal dispersions especially adapted to be electrodeposited at the anode to form corrosion resistant coatings, and to water soluble hydroxy polyether condensation resins which are especially adapted for this purpose, particularly when used in admixture with certain benzoguanamine-formaldehyde resins with electrodeposit approximately proportional to the concentration of the respective resins in the deposition bath to enable the polyether condensation resins to be cured by baking after electrodeposition.

In recent years, electrodeposition on the anode of relatively low molecular weight resins which can be dispersed in water in the form of a salt or soap with a volatile nitrogenous base such as an amine has taken on increasing importance. However, those resins which can be handled in the aqueous systems used are sensitive to water and to alkalis so that the film which is deposited, even after baking, lacks resistance to corrosion. This inadequate corrosion resistance persists despite the deposition and cure of curable systems, and when materials of the type of melamine-formaldehyde condensates are utilized for the cure, there has been difficulty in electrodepositing these together with the resin which is to be cured since the two resins are not transported to the anode at the same rate. Moreover, there is a tendency to deposit films of excessive thickness, especially when higher deposition voltages are used in order to maximize the "throwing power" of the system. The term "throwing power" identifies the capacity of the system to deposit resin in locations which are remote from the cathode electrodes, and the invention is also concerned with systems which can sustain high voltages without film breakdown in order to develop the desired throwing power.

Another difficulty experienced in conventional electrodeposition baths is the fact that the amines used to solubilize the deposited resin are left behind in the bath to accumulate and increase pH. These amine accumulations become significant in practical operation and one or more techniques must be used to regulate the pH of the bath to maintain the required electrodeposition characteristics. Dialysis is one technique which can be used to regulate pH, but his adds to the cost of the equipment used and its operation. It is also possible to supply the acidic resin which is used in its acid form to be dispersed in the alkaline electrodeposition bath where it can consume the accumulated amine, but this involves mixing equipment and the use of baths of higher pH and resins of higher acidity. The present invention effectively eliminates the need for pH control since the invention can be carried out without any significant amine accumulation using a pH close to neutral because only trivial amounts of amine are required to solubilize the resins of the invention. In this way the deposition of large amounts of resin is accompanied by the release of very small amounts of amine and volatilization and other incidental amine losses are adequate to maintain the pH of the system.

In accordance with the present invention, a polyhydric polyether, preferably a polyhydric aliphatic polycyclic polyether is partially esterified with a monocarboxylic acid to provide an organic solvent-soluble hydroxy ester intermediate. This intermediate is then reacted with a polybasic acid anhydride such as trimellitic anhydride to provide carboxyl functionality without cross-linking the resin. This carboxyl-functional intermediate is then reacted with a monoepoxide to form an hydroxy ester of low acidity, preferably in the range of an acid number of from 8-25. The reaction with monoepoxide serves to eliminate undesirable acidity while, at the same time, providing reactive hydroxy groups which are removed from the polyether backbone. The reaction of the monoepoxide is preferably assisted by the presence of a small proportion of alkaline catalyst which reacts with some of the acid groups and provides a resin which is at least colloidally soluble in water so that aqueous systems can be formed which may have an approximately neutral pH, e.g., a pH of less than 7.7. The preferred alkaline materials are volatile, e.g., amines, but nonvolatile bases such as sodium and potassium are usable and these can be removed if desired as by washing with phosphoric acid or, and especially when small amounts of base are used for water dispersibility, nonvolatile bases may be used for electrodepositing the resin. While larger amounts of amine can be used either as catalyst or by adding the same later, it is a feature of the invention to operate efficiently at a lower pH so that the need for pH control can be reduced or eliminated. It is stressed that an alkaline pH in aqueous medium is easily provided with resins in which only a small proportion of the residual carboxyl functionality is reacted with the base.

The acidic hydroxy esters of the invention can be cured by themselves, but a superior cure can be obtained in combination with aminoplast resins. The term "aminoplast resins" is a common one used to define heat-hardening condensation products of amines and especially triazines with excess formaldehyde. Condensation products of excess formaldehyde with melamine, benzoguanamine, and urea constitute typical aminoplast resins and the hydroxy esters of the invention exhibit good compatibility with such materials. The condensation reaction, as is well known, is normally carried out in alcoholic solvent medium, such as methanol, ethanol, butanol or higher alcohol. Broadly, the aminoplast helps the cure when used in water soluble or water dispersible form and proportions of 1-40 percent, preferably 5-30 percent, based on total resin, are used to form films which cure more extensively and at lower temperature.

Unfortunately, and as is known, the simultaneous electrophoretic deposition of acidic resin soaps and aminoplast resins is difficult because the two different resins do not electrodeposit at the same rate. A feature of the invention is the finding that in the low acid number, low pH electrophoretic systems of the invention, benzoguanamine-formaldehyde condensates dispersed in the electrophoretic bath deposit surprisingly well and substantially in proportion to the concentration thereof in the bath.

Electrodeposition is particularly intended for the deposition of thin films, but the utilization of resins of higher acidity as is typical in the prior art provides a more conductive deposit and the film thickness tends to build undesirably. The materials of lower acid number used in the invention enable thinner films to be produced at the high voltages which are preferred. Moreover, the benzoguanamine-formaldehyde condensates which are used enable a further reduction in film thickness and the films which are deposited outstandingly resist breakdown at high voltage whether an aminoplast component is included or not.

Referring more particularly to the polyhydric polyethers which are used in accordance with the invention, these can be of diverse type but, and from the standpoint of availability, the most usual materials of this character are epoxy resins in which linear polymer growth has produced secondary hydroxy groups spaced along the linear polyether structure. The epoxy group itself is viewed as a diol anhydride. The preferred materials are aliphatic in order to enhance affinity for water, but it is not essential that the entire polyether be aliphatic since linear polyethers based on glycidyl derivatives of aromatic compounds can be used, e.g., polymers of the diglycidyl ethers of bisphenols such as bisphenol A (the term bisphenol denotes a pair of phenolic groups linked together through a divalent aliphatic group). Preferred polyepoxides are based on an aliphatic backbone, e.g., ethylene glycol, propylene glycol, butylene glycol, diethylene glycol, dipropylene glycol, dibutylene glycol, and the like, these being typically in the form of glycidyl ethers. On the other hand, it is particularly preferred to employ aliphatic polycyclic polyethers, particular reference being made to a commercial material available from Union Carbide and identified by the trade designation "'UCAR'

POLYOL DCP-200." The formula and physical properties of this material are listed below:

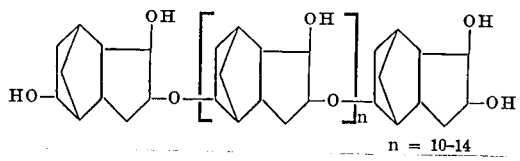

n = 10-14

Physical Properties of "UCAR" POLYOL DCP-200

| Physical appearance | Light straw-colored solid |
|---|---|
| Softening point | 170-200° C. |
| Hydroxyl, percent | 11.4-12.2 |
| Ester equivalent [1] | 145 |
| Solution viscosity in dimethyl formamide, 50 percent | 150-225 cps |
| Gardner color of a 50 percent solution in dimethyl formamide | 7 max |
| Specific gravity | 1.22 |
| Bulk density | 42-43 lbs/cu. ft. |
| Non-volatiles, percent | 98 |

[1] Grams required to esterify 1 gram mol weight of fatty acid.

Any organic compound containing a single carboxyl group and free of interfering functionality can be utilized to esterify a portion of the hydroxy groups present in the polyether. Preferably, a long chain acid is used which may be saturated or unsaturated but which is typically derived from an oil which may be a drying oil, a semidrying oil or a nondrying oil. The specific nature of the esterifying monocarboxylic acid is of secondary consideration, but it functions to plasticize the resin, reduce its cost and reduce the functionality of the polyhydric compound.

Broadly speaking, one can utilize sufficient monocarboxylic acid to react with from 5-95 percent of the hydroxy groups which are available, but preferred practice is to use sufficient monocarboxylic acid to esterify from 20-80 percent of the hydroxy groups which are available. This initial esterification reaction is desirably carried to a low acid number, e.g., less than 10 since it is not advantageous to have free acid remaining in the reaction mixture.

The ester obtained in the first stage reaction of monocarboxylic acid with polyhydric polyether is then reacted with a polycarboxylic acid anhydride such as trimellitic anhydride. The point is that the acid selected should contain a single anhydride group and, preferably also, at least one further carboxylic acid group. As a result, the single anhydride group can react with at least a portion of the remaining hydroxy groups in the polyether to thereby generate a carboxyl group and with no danger of gelation since the single anhydride group will react easily under conditions under which the carboxyl group does not react rapidly. Using trimellitic anhydride as an illustration, the anhydride group reacts to bind the trimellitic moiety to the polyether and, for each such reaction, there are two carboxyl groups provided in the resin, one being the carboxyl group originally present in the trimellitic anhydride compound and the second being generated by reaction of the anhydride group.

In the manner indicated above, a resin is produced having a linear polyether backbone and carboxyl functionality which is available for reaction and which is spaced along the polymer chain. Desirably, the acid number provided after the reaction with the anhydride group has been completed is desirably at least 20 and more preferably at least 30, but acid numbers in excess of 100 are least preferred.

The carboxyl-functional material produced as aforesaid is then reacted with a monoepoxide to reduce the acidity and produce an hydroxy ester. Preferred practice of the invention reduces the acidity to the range of from 12-25, but at least some of the advantage of the invention is achieved to the extent that the monoepoxide is used and to the extent that excessive acidity is consumed thereby. Acid numbers as high as 50 illustrate least preferred practice of the invention, but it is stressed that there are important features of the invention achieved at acid numbers less than 30 which cannot be practically duplicated at higher acid numbers. The reduced acid values relied upon in the present development not only provide coatings which are far less sensitive to water, but the conductivity of the film is reduced so that excessively thick films are not deposited and it is a feature of the new process to achieve adequate colloidal dispersibility in water with such a low acid number. The utilization of linear polyethers and the uniform distribution of the available hydroxy ester side groups derived from the reaction with monoepoxide, enables the small proportions of acid which are relied upon herein to provide adequate dispersion of the condensation product in aqueous medium using a base, such as organic amine or ammonia.

Indeed, in preferred situations, it has been found that proportions of amine consistent with their use as catalysts to foster the reaction of the monoepoxide with the carboxyl functionality available in the carboxyl-functional intermediate are sufficient to enable effective dispersion of the final product in water with the formation of a stable colloidal dispersion. It is sometimes desirable to facilitate dispersion by employing an organic solvent which is miscible with water since this facilitates subsequent dispersion of the polymer in the desired aqueous media. The preferred solvents are: dioxane, ethanol, isopropanol, 2-ethoxy ethanol, methyl ethyl ketone, 2-ethoxy ethanol acetate, propyl alcohol, butoxy ethanol, etc.

Referring to factors of secondary significance, typical monocarboxylic acids, e.g., fatty acids which may be used in accordance with the invention are illustrated by soya fatty acids, linseed fatty acids, castor oil fatty acids and the like. While the shorter chain acids such as hexoic acid are less preferred, they can be used.

While trimellitic anhydride is a preferred anhydride for use in the invention other anhydrides can be used such as maleic anhydride, succinic anhydride, acetic anhydride, propionic anhydride, phthalic anhydride, and hexahydrophthalic anhydride.

With respect to the monoepoxide used to generate hydroxy ester groups, any monoepoxide can be used which is free of functional groups which would interfere with the reaction between the carboxyl-functional intermediate and the monoepoxide. The preferred monoepoxides are the $C_2$–$C_4$ monooxides such as ethylene oxide, propylene oxide, and butylene oxide. The low molecular weight aliphatic compounds are superior from the standpoint of water solubility. However, styrene oxide can be used though it is less preferred. Also, higher molecular weight monoepoxides can be used, but these are, again, less preferred.

On the other hand, alpha-branched saturated monocarboxylic acids and especially tertiary fatty acids in the form of a glycidyl ester are quite good and have been found to be of unique value in providing reactive hydroxy esters which are fully compatible with water and which help to provide desirable physical properties in the final resin product. These have the formula:

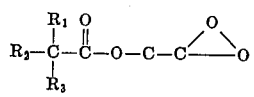

in which $R_1$ and $R_2$ are alkyl radicals having a chain length of from 2-18 carbon atoms and $R_3$ is the same as $R_1$ and $R_2$ or hydrogen. The compound in which $R_1$, $R_2$ and $R_3$ are all pH which radicals containing from nine to 11 carbon atoms is identified as tertiary glycidyl ester A and is used in some of the examples hereinafter.

The specific nature of the nitrogenous base which is selected to aid solubility is not a primary feature of the invention. Ammonia is a useful nitrogenous base, but aliphatic amines are preferred. These aliphatic amines are illustrated by monomethyl amine, dimethyl amine, diethyl amine, triethyl amine and morpholine. The proportion of the nitrogenous base is determined by the pH which is desired in the electrodeposition bath.

As previously indicated, the aqueous colloidal dispersions of the invention are intended to be applied by electrodeposition. While these aqueous systems can be applied directly as by spraying or roller coating, they are preferably used in an electrodeposition process in which a unidirectional electrical current is passed through the bath to cause deposition on the anode. For such purpose, the colloidal dispersion is preferably formulated to contain 5-15 percent solids content in water and is used at a pH of from 6-8.5, preferably at a pH less than 8.0. A pH of 8.5 represents an approximate upper limit of basicity for the electrodeposition bath.

The hydroxy esters of the invention are desirably combined with an aminoplast resin to enhance the thermosetting properties of the film which is deposited. The hydroxy esters are dispersed in water in the form of an amine soap which is transported efficiently by the unidirectional current used for deposition. On the other hand, aminoplast resins do not transport as well. In the invention, certain benzoguanamine-formaldehyde resins are used as a dispersion and, surprisingly, the two resins may be electrically transported together and without either of the resins significantly building up or becoming depleted in the electrophoretic bath.

The benzoguanamine-formaldehyde resins used are water-dispersible and nonwater-soluble heat-hardening condensates of benzoguanamine with a stoichiometric excess for formaldehyde and are, per se, well known. An appropriate commercially available water-dispersible and nonwater-soluble heat-hardening benzoguanamine-formaldehyde resin is Uformite QR-336, a product of Rohm & Haas Co.

proportion of amine is increased, the aqueous systems of the invention approach a true solution.

The preferred proportions in accordance with the invention are as follows.

First, approximately half of the hydroxy functionality of the polyhydric polyether is consumed, e.g., from 30-70 percent. The hydroxy functionality which remains is then reacted with the anhydride component in an amount to provide a carboxyl functionality which is approximately equal to the remaining hydroxy functionality. Again, approximate equality is intended to identify a variation of ±20 percent. This can be illustrated using one mole of trimellitic anhydride for every 3 moles of residual hydroxy functionality available for reaction therewith. In this way, the 1 mole of trimellitic anhydride generates two equivalents of carboxyl functionality while consuming one of the three available hydroxy functionalities to leave two thereof. The product so obtained is then reacted with the monoepoxide, preferably in an amount to consume at least 50 percent of the carboxyl groups which are available. In this way, a final product is obtained of low acid number and possessing a relatively high hydroxy functionality.

Another way to view proportions is on an overall basis, e.g., to total the hydroxy functionality derived from the polyether and from the monoepoxide and to total the carboxyl functionality derived from the fatty acids and the anhydride. On the basis of total functionality, the invention desirably uses an excess of hydroxy functionality, e.g., an excess of from 5 to 100 percent, preferably from 10 percent to 50 percent.

Preferred resins are dispersible in water to provide adequate stability for continuous electrodeposition when the resin is only partially satisfied with base. For this purpose, it is preferred to employ a resin with a higher hydroxy functionality, preferred hydroxy functionalities being in excess of 15.

The invention is illustrated in the examples which follow.

EXAMPLE 1

Preparation of Resin "A"

| Parts by weight | | |
|---|---|---|
| 1,946 | Polyhydric polyether—UCAR Polyol DCP-200 (Hydroxyl percent=12%) (Ester equivalent=145). | Charge into reactor. Heat to 215° C. Set Dean-Stark trap and distill off water of esterification. Hold for acid value of 4 to 6. Distill off xylol. Cool to 90° C. and add: |
| 1,834 | Soya fatty acids | |
| 60 | Xylol (reflux) | |
| 220 | Trimellitic anhydride | Reheat to 100-110° C. and hold for acid value of 35-38. |
| 400 | Methyl ethyl ketone | |
| 800 | Methyl ethyl ketone | Add; Reheat to 90° C. |
| 53 | Triethyl amine | |
| 115 | Butylene oxide | Add from addition funnel over 30 minutes. Hold for acid value of 24-26. Cool to room temperature. |

NOTE: See the following table:

Final characteristics of hydroxy ester

| | |
|---|---|
| Solids (percent) | 78.2 |
| Viscosity | X-Y |
| Acid value | 25.1 |

Coating Procedure

The films deposited in accordance with the invention are baked to cure the same. In the absence of an aminoplast resin, baking temperatures of approximately 350° F. and higher are desirably used in order to achieve a measure of cure by reaction between the carboxyl and hydroxy functionalities present in the resin. The hydroxy groups may also condense with one another in the presence of the carboxyl groups. In the presence of an aminoplast resin, the baking temperatures which may be used are lowered and a more extensive cure is possible. Appropriate baking temperatures are from 300°-500° F. for periods varying from about 30 seconds at the highest baking temperatures to about an hour at the lowest temperatures.

As will be gathered from the discussion presented hereinbefore, the preferred materials have an acid number of from 12-25 and contain very little amine and these form colloidal dispersions in water from which they electrodeposit excellently and resist breakdown at high deposition voltages. Moreover, the aqueous systems are stable at a pH of 7.6 and below, the preferred pH being from 6.5-7.5. On the other hand, if the acid number of the product increases and as the The coating operation is performed in a metal tank, which is equipped with a recirculating pump and a thermometer. The tank serves as a cathode and zinc phosphate treated steel panels or aluminum panels are utilized as the anodes.

The volume of the bath is 2 liters. Direct current is imposed on the metal container (cathode) and on the panels (anode) from an external circuit. Panels 4 inches wide and 8 inches dipped length are used as the anodes for coating.

The voltage across the bath is run up from zero to the voltage desired (maximum of 550 volts) during panel coating to deposit a film, before electrical resistance of the film virtually stops deposition at the maximum voltage used. The deposited film, even before baking, is water resistant, slightly tacky and has very good adhesion to metal. The current details are tabulated hereinafter.

The product of example 1 is partially amine satisfied and will disperse in water without additional amine. Additional amine enhances stability for continuous operation and is used in the formulations which follow. However, the partially neutralized acidic product can be dispersed in water to form an aqueous concentrate having a resin solids content of from 25–60 percent and this aqueous concentrate can be used directly to replenish the solids consumed by electrodeposition to prevent the buildup of base in the bath.

After baking for 20 minutes at 400° F., the films cure to a solvent resistant, pore free, hard and flexible coating.

Formulations for Electrocoating

A clear formulation, using polyether resin "A," is made by thoroughly mixing:

| 1. Polyether resin "A" | 100.0 parts |
|---|---|
| Triethyl Amine | 4.5 parts |
| Deionized Water | 845.5 parts |
| | 950.0 |

The above formulation has a solids content of approximately 8 percent and is subjected to a direct current at various potentials from 50 to 350 volts to provide the results tabulated hereinafter.

Clear formulations using polyether resin "A" and various aminoplast resins are as follows:

| 2. Polyether resin "A" | 120.0 parts |
|---|---|
| Benzoguanamine Resin (see note 1) 70% non-volatile solids | 14.3 parts |
| Triethyl Amine | 5.4 parts |
| Deionized Water | 860.3 parts |
| | 1000.0 |
| 3. Polyether resin "A" | 107.0 parts |
| Benzoguanamine Resin (see note 1) 70% non-volatile solids | 28.5 parts |
| Triethyl Amine | 4.8 parts |
| Deionized Water | 859.7 parts |
| | 1000.0 |
| 4. Polyether resin "A" | 93.3 parts |
| Benzoguanamine Resin (see note 1) 70% non-volatile solids | 42.8 parts |
| Triethyl Amine | 4.2 parts |
| Deionized Water | 859.7 parts |
| | 1000.0 |
| 5. Polyether resin "A" | 120.0 parts |
| Melamine Resin (see note 2) | 10.0 parts |
| Triethyl Amine | 5.4 parts |
| Deionized Water | 864.6 parts |
| | 1000.0 |
| 6. Polyether resin "A" | 107.0 parts |
| Melamine Resin (see note 2) | 20.0 parts |
| Triethyl Amine | 4.8 parts |
| Deionized Water | 865.2 parts |
| | 1000.0 |
| 7. Polyether resin "A" | 93.3 parts |
| Melamine Resin (see note 2) | 30.0 parts |
| Triethyl Amine | 4.2 parts |
| Deionized Water | 872.8 parts |
| | 1000.0 |

Vigorous agitation is used when the water and amine are added to the resin components of formulations 2–7 to provide baths containing 10 percent nonvolatile solids which are electrodeposited at potentials of from 50 to 350 volts. The properties of the coatings obtained and other factors regarding the electrodeposition are tabulated below.

| Formulations | 1 | 2 | 3 | 4 | 5 | 6 | 7 |
|---|---|---|---|---|---|---|---|
| Coulombs/gram | 46 | 44 | 38 | 32 | 40 | 36 | 32 |
| Amps/sq. ft. | 1.3 | 1.2 | 1.0 | .86 | .9 | 1.3 | 1.9 |
| Specific film resis | 6,186 | 8,959 | 12,671 | 10,542 | 7,576 | 3,031 | 1,085 |
| Detergent resistance * | 6D | 8M | 8F | 8F++ | 8M | 6D | 6VF |
| Solvent resistance | Soften | Ok | Ok | Ok | Ok | Ok | Ok |
| Flexibility (conical mandrel) | Ok | Ok | Ok | ¾″ | ⅛″ | ¾″ | ¾″ |
| Impact-direct (in./lbs.) | 40 | 30 | 20 | 10 | 20 | 20 | 10 |
| Rupture voltage | 250 | 250 | 325+ | 325+ | 250 | 200 | 150 |

*Detergent resistance is determined by a commercially used test in which the density and size of the blisters which are produced by 48 hour immersion in 1% aqueous Tide solution are used to indicate commercial acceptance. The results are reported by combinations of numbers and letters. The numeral 6 identifies medium size blisters whereas the numeral 8 identifies small blisters. The letters VF identify very few blisters and F identifies a few blisters, F++ being intermediate F and VF. M identifies a moderate blister density and D a high blister density.

Note 1 – The benzoguanamine resin utilized is a water dispersible nonwater-soluble, heat-hardening condensate of benzoguanamine with a stoichiometric excess of formaldehyde. The product is produced by reacting 750 grams of n-butyl Formcel (40% formaldehyde, 51.5% n-butanol and 8.5% water), 630 grams benzoguanamine, and 412 additional grams of n-butanol. The mixture is heated with agitation to 195-200° F. which is maintained for 10-15 minutes until all of the benzoguanamine has dissolved. The pH is adjusted to 4.3-4.5 using a 10% aqueous formic acid solution (approximately 50 milliliters are needed). The temperature is then raised to 203-206° F. to distill n-butanol which is returned as reflux until water (not returned) is no longer generated. After water is no longer generated, butanol is collected in an amount equal to the volume of water which had been collected. The product is then thinned with 310 grams xylene and 135 grams n-butanol and is filtered and then adjusted to 60% non-volatile solids using a 50/50 weight ratio mixture of xylene and n-butanol. If desired, comparable results can be obtained by utilizing in place of the benzoguanamine resin condensate described above, the commercial material Uformite QR-336 (Rohm & Haas).

Note 2 – The melamine resin utilized is a heat-hardening melamine-formaldehyde condensate commercially available from American Cyanamid under the trade designation XM-1116 and which is specifically recommended by them for use in electropainting.

Comparing the benzoguanamine-formaldehyde condensates of the invention with typical melamine-formaldehyde condensates used for the same purpose, the specific film resistances obtained utilizing the invention are much higher than those normally obtained and, especially when the benzoguanamine resin is used instead of the melamine resin. First, the low acid number of the resins used in the invention and the capacity of the resin per se to resist 250 volts speaks for itself. Moreover, and using proportions of benzoguanamine-formaldehyde resin in the range of from 10–30 percent, the specific film resistance ranges from about 9,000 to about 12,000. In contrast, and with the melamine resin, the specific film resistance is about 6,000 at the 10 percent concentration level and is reduced progressively to approximately 1,000 at the 25 percent level. As will be suspected, from the film resistances indicated, the rupture voltages in the invention are quite good, e.g., the rupture voltage in the absence of the benzoguanamine-formaldehyde condensate is 250 volts and, when approximately 20 percent of the benzoguanamine resin is added, the rupture voltage is increased to 325+ volts. This high rupture voltage persists at the 30 percent benzoguanamine-formaldehyde level. In contrast, when the melamine resin level is increased above about 10 percent, the rupture voltage falls so that, at about 25 percent melamine resin content, the rupture voltage is reduced to 150 volts.

In order to establish the relative rate of migration, 80 parts of Polyether Resin "A" are blended in a first trial with 20 parts of the benzoguanamine resin; in a second trial with 20 parts of the dispersed melamine resin noted above; and in a third trial with a water-soluble melamine-formaldehyde condensate (hexamethoxymethyl melamine-Cymel 300). Utilizing the benzoguanamine resin, the electrodeposited film contains 19.8 percent of the benzoguanamine resin as measured by nitrogen analysis, almost an exact match for the concentration in the bath. However, utilizing the melamine resin in dispersed form, only 14.4 percent of the melamine resin is present in the electrodeposited film. Utilizing the water-soluble melamine resin (Cymel 300) only 5.5 percent of the melamine resin is present in the electrodeposited film.

It is pointed out that the triethyl amine in example 1 functions both as a basic catalyst which fosters the reaction of the monoepoxide with the carboxyl groups of the resin, and it may also provide some soap forming qualities, but catalytic properties are primarily utilized in example 1. It is to be noted that the reaction temperature is such that amine losses can be expected. Other alkaline catalysts may be used in place of the triethyl amine of example 1 such as benzyl trimethyl ammonium chloride or other quaternary ammonium salts, sodium benzoate, sodium iodide, sodium oleate, potassium thiocyanate, lithium chloride and the like.

The proportion of alkaline esterification catalyst which is utilized is of secondary consideration so long as sufficient is used to promote the desired esterification reaction and the production of the hydroxy ester.

EXAMPLE 2

Preparation of Hydroxy Polymer Utilizing Glycidyl Ester of Saturated Tertiary Acid

| Parts by weight | | |
|---|---|---|
| 1,174 | Polyhydric polyether (same as in Example 1) | Charge into reactor. Heat to 210° C. Set Dean-Stark trap filled with Xylol. Remove water of esterification using azeotropic distillation. Hold for Acid Value of 4 to 6. Distill off Xylol and cool to 90° C. |
| 1,106 | Soya fatty acids | |
| 30 | Xylol (reflux) | |
| 265 | Trimellitic anhydride | Add. Reheat to 100–110° C. and hold for Acid Value of 60–70. |
| 241 | Methyl ethyl ketone | |
| 483 | Methyl ethyl ketone | Add. Reheat to 90° C. |
| 64 | Triethyl amine | |
| 473 | Tertiary glycidyl ester A (epoxide equivalent: 240) | Add monoepoxide from a separatory funnel over 30 minutes. Hold for Acid Value of 19–21. |

Note: See the following table:

| Final characteristics of the resin are as follows | |
|---|---|
| Solids (percent) | 75 |
| Viscosity (Gardner) | V–W |
| Acid value | 21 |

The above resin is formulated into a clear aqueous bath containing 10 percent nonvolatile solids using 4.5 parts of triethyl amine per 100 parts of polyether resin as in example 1. Eighty percent of these solids are the hydroxy condensation polymer and the other 20 percent are the benzoguanamine resin identified in note 1 of example 1. Upon electrodeposition utilizing a direct current having a potential of from 30–350 volts, coatings of excellent properties are deposited and film rupturing is not encountered, even with the highest voltage named.

EXAMPLE 3

| Preparation of Water Soluble Condensation Utilizing Saturated, Nonoxidizing Type | Resin acids |
|---|---|

Parts by Weight

| | |
|---|---|
| 1174 | Polyhydric Polyether (same as in Example 1) |
| 1106 | Stearic Acid |
| 20 | Xylol (reflux) |
| 132 | Trimellitic Anhydride |
| 240 | Methyl Ethyl Ketone |
| 272 | Methyl Ethyl Ketone |
| 25 | Triethyl Amine |
| 68 | Butylene Oxide |

The above materials are reacted in accordance with the same procedure reported in example 2 to provide a final resin solution having the following characteristics:

| | |
|---|---|
| Solids (percent) | 81 |
| Viscosity (Gardner) | $Z_1$–$Z_3$ |
| Acid Value | 19 |

The properties of coatings electrodeposited from an aqueous bath containing the resin produced in the present example are approximately the same as those provided in example 2.

The above resin is formulated into a clear aqueous bath containing 8 percent nonvolatile solids, 80 percent of the solids being the hydroxy condensation polymer and the other 20 percent being the benzoguanamine resin identified in note 1 of example 1. Upon electrodeposition utilizing a direct current having a potential of from 30–350 volts, coatings of excellent properties are deposited and film rupturing is not encountered, even with the highest voltage named. Interestingly, no additional amine is needed to dissolve the resin of the present example, the triethyl amine used as catalyst providing a pH of 7.45 at a solids content of 8 percent.

The present example serves to point up the capacity of the benzoguanamine resin to control film thickness.

First, and utilizing the 80/20 resin mixture of example 4, the following film thicknesses were obtained by varying the voltage from 50–325 volts:

| Voltage | Film Thickness (mils) |
|---|---|
| 50 | 0.1 |
| 100 | 0.25 |
| 150 | 0.55 |
| 325 | 0.85 |

Repeating the foregoing, but utilizing a 70/30 weight ratio mixture instead of an 80/20 mixture so as to employ an increased proportion of benzoguanamine resin (a small amount of triethyl amine is added to better accommodate the larger proportion of benzoguanamine resin at a pH of 8.25), the following film thicknesses are deposited:

| Voltage | Film Thickness (mils) |
|---|---|
| 50 | 0.1 |
| 100 | 0.22 |
| 150 | 0.28 |
| 200 | 0.38 |
| 250 | 0.42 |
| 325 | 0.50 |

As will be understood, the voltage is in good measure determined by the throwing power desired consistent with the rup-

EXAMPLE 4

| Parts by weight | | |
|---|---|---|
| 1,174 | Polyhydric polyether (same as in Example 1) | Charge into reactor. Heat to 210–215° C. Set Dean-Stark trap and distill off water of esterification. Hold for Acid Value of 4 to 6. Distill off Xylol and cool to 90° C. |
| 1,106 | Soya fatty acids | |
| 30 | Xylol (reflux) | |
| 265 | Trimellitic anhydride | Add. Reheat to 100–110° C. and hold for Acid Value of 65–70. |
| 241 | Methyl ethyl ketone | |
| 483 | Methyl ketone | Add methyl ethyl ketone and triethyl amine. Reheat to 90° C. Add butylene oxide from separatory funnel over 30 minutes. Hold for Acid Value of 19–21. Cool to room temperature. |
| 64 | Triethyl amine | |
| 139 | Butylene oxide | |

NOTE: See the following table:

| Final characteristics of hydroxy ester are as follows | |
|---|---|
| Solids (percent) | 73.9 |
| Viscosity (Gardner) | W–X |
| Acid value | 21.5 | ture resistance of the resins used. On the other hand, and when the thicker films are not desired; an increased proportion of benzoguanamine resin in accordance with the invention will serve this function.

To illustrate how conventional melamine-formaldehyde resins alter the situation, in place of the 80/20 weight ratio mixture noted hereinbefore, an 80/15/5 weight ratio mixture is employed, 5 parts of the benzoguanamine resin being replaced by 5 parts of the dispersed melamine resin of example 1, note 2. No additional triethyl amine was needed and the aqueous bath contained 10 percent solids at a pH of 6.95. The following film thicknesses are deposited:

| Voltage | Film Thickness (mils) |
| --- | --- |
| 50 | 0.12 |
| 100 | 0.26 |
| 150 | 0.45 |
| 200 | 0.85 |
| 250 | 1.0 |
| 325 | 1.1 |

To further illustrate the use of conventional melamine-formaldehyde resins, an 80/20 weight ratio mixture is utilized, with the 20 parts being entirely constituted by the dispersed melamine resin of example 1, note 2. The following film thicknesses are deposited.

| Voltage | Film Thickness (mils) |
| --- | --- |
| 50 | 1.15 |
| 100 | 2.3 |
| 150 | 3.55 |
| 325 | Extremely Heavy Layer - Flows Off the Vertical Panel |

It should also be observed that the reaction with trimellitic anhydride produces a product having an acid value in the range of 65-70. A specimen of this intermediate product having an acid value of 69 is removed and used as a control. Films of this intermediate product and also of the final product of the present example 4 are drawn down on tinplate using a 3-mil draw down bar. The films so produced are baked for 20 minutes at 325° F. and then cooled to room temperature and immersed in 1 percent potassium hydroxide solution in order to test the chemical resistance of the product. The following results were obtained.

| Example 4 (Intermediate) | Example 4 (Final) |
| --- | --- |
| Acid Intermediate (Before reacting with epoxide) Acid Value: 69 | Final Hydroxy Product (After Reacting with epoxide) Acid Value: 21.5 |
| Baked 30 minutes at 325° F | Baked 30 minutes at 325° F |
| Complete disintegration. Film removed from the panel after 24 hours immersion in 1% KOH. Very poor alkali Resistance. | No effect after 24-hour immersion in 1% KOH solution. Film continuous and adherent. |

As will be seen from the foregoing, the reaction with monoepoxide reduces the acidity and increases the capacity for cure to an alkali-resistant finish. Residual unconsumed acidity in the cured product also leads to failure when coated panels are tested for salt spray or detergent resistance as well as resistance to destruction in dilute caustic solution.

It is to be noted that the volatility of the base which is used to solubilize the polycarboxylic resin is primarily of significance when the molecules which are electrodeposited are associated with residual base which must be removed when the coating is baked. The problem of removing base by volatilization is particularly important whenever the resin used has a high acid number with a plurality of the acid groups being neutralized as evidenced by a high bath pH. By using resins which are water dispersible at low acid number with small amounts of base insufficient to react with the available acidity (preferably a stoichiometric deficiency of 50 percent or more) the volatility of the base becomes of secondary significance and it becomes possible to use alkali metals such as sodium and potassium to solubilize or disperse the polycarboxylic resin. The point is to minimize the amount of base which is deposited and thereby minimize the amine which is wasted and enable the use of a nonvolatile base. It will also be recalled that the resin is deposited as an anion and base is displaced when the anion is formed and deposited. The less base used to disperse the resin in the bath, the larger is the proportion of the base in the resin which is electrically displaced during electrodeposition. Also, any residual base included in the deposited film increases the conductivity of the film and this leads to the deposit of excessive film thicknesses and to decreased resistance to rupture of the film at high deposition voltage. Both of these disadvantages are minimized in the invention.

An electrodeposition proceeds in the present invention utilizing the 8 percent solids aqueous bath containing an 80/20 weight ratio mixture of the hydroxy condensate polymer with the benzoguanamine resin, the solids content of the bath is decreased. These solids can be replenished by adding to the bath an appropriate proportion necessary to restore the 8 percent solids content of the same aqueous bath composition used initially but with the exception that it is more concentrated, e.g., containing 20 percent nonvolatile solids. In this way, the accumulation of water in the bath is minimized and the amine does not perceptibly accumulate as indicated by maintenance of a pH below pH 7.7 despite prolonged operation of the process. It is stressed that the resin of the present example 4 is directly dispersible in water without the utilization of any additional base so that the replenishment solution can be directly formulated in any desired concentration.

The invention is not to be construed by any abstract of disclosure, but its features are instead characterized in the description given hereinbefore and is defined in the claims which follow.

We claim:

1. A heat-hardening alkaline water-dispersible condensation resin comprising a linear polyhydric polyether having a first part of its hydroxy functionality consumed by reaction with monocarboxylic acid and a second part of its hydroxy functionality consumed by reaction with the acid anhydride group of a polycarboxylic acid monoanhydride, thereby providing a polycarboxylic intermediate, a portion of the carboxy groups of said polycarboxylic intermediate being reacted with a monoepoxide to reduce the acid number of the product to a value of from 8 to below 50 and to generate additional hydroxy functionality remote from the linear backbone of the polyether.

2. A heat-hardening condensation resin as recited in claim 1 in which at least a portion of the acid groups in the final product are reacted with a nitrogenous base.

3. A heat-hardening condensation resin as recited in claim 1 in which at least a portion of the acid groups in said final product are reacted with an alkali metal base.

4. A heat-hardening condensation resin as recited in claim 1 in which said monocarboxylic acid is a fatty acid and is used in an amount to react with from 20-80 percent of the hydroxy functionality in said polyhydric polyether.

5. A heat-hardening condensation resin as recited in claim 1 in which said polycarboxylic acid monoanhydride is trimellitic anhydride.

6. A heat-hardening condensation resin as recited in claim 1 in which said monoepoxide is selected from the group consisting of ethylene oxide, propylene oxide, butylene oxide, glycidyl ester of tertiary monocarboxylic acids, and mixtures thereof 7. A heat-hardening condensation resin as recited in claim 1 in which said monoepoxide is a glycidyl ester having the formula:

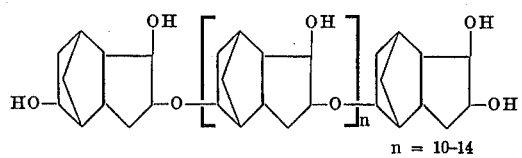

in which $R_1$ and $R_2$ are alkyl radicals having a chain length of from two–18 carbon atoms and $R_3$ is the same as $R_1$ and $R_2$ or hydrogen.

8. A heat-hardening condensation resin as recited in claim 1 in which said condensation resin is reacted with a base in an amount sufficient to provide dispersibility in water and said water dispersible product has an acid number prior to neutralization of from 8–25.

9. A heat-hardening condensation resin as recited in claim 1 in which said linear polyhydric polyether is an aliphatic polycyclic polyether.

10. A heat-hardening condensation resin as recited in claim 9 in which said polycyclic polyether has the formula:

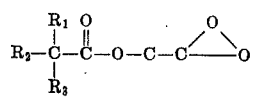

$n = 10-14$

11. A heat-hardening condensation resin as recited in claim 1 in which said resin has a hydroxyl number of at least 15.

12. A heat-hardening mixture comprising the alkaline water-dispersible condensation resin of claim 1 in admixture with aminoplast resin.

13. A heat-hardening alkaline water-dispersible condensation resin comprising an acidic adduct of a monoepoxide with carboxyl groups carried by a linear polyhydric polyether partial fatty ester, said carboxyl groups being bound to said linear polyether by ester groups and said acidic adduct having an acid number of from 8 to below 50.

14. A heat-hardening condensation resin as recited in claim 13 in which said acidic adduct is partially neutralized with a base and is directly dispersible in water in said partially neutralized condition.

15. A heat-hardening condensation resin as recited in claim 13 in which said partially neutralized acidic adduct has an acid number of from 8–25 and provides a pH when dispersed in water at a solids content of 10 percent below pH 7.7.

16. An aqueous dispersion of the heat-hardening condensation resin recited in claim 13, dispersion in water being effected with the aid of a base, said dispersion including dispersed water-insoluble aminoplast resin.

17. An aqueous dispersion as recited in claim 16 in which said aminoplast resin is a water-dispersible nonwater-soluble, heat-hardening condensate of benzoguanamine with a stoichiometric excess of formaldehyde.

18. A heat-hardening condensation resin as recited in claim 1 in which the acid value of said polycarboxylic intermediate is not in excess of 100.

19. A heat-hardening condensation resin as recited in claim 1 in which the hydroxy groups in the resin are consumed by reaction with the anhydride in an amount of one mole of hydroxy functionality for each mole of anhydride used.

20. A method of producing a heat-hardening condensation resin dispersible in water with a minimum proportion of amine comprising reacting a first portion of the hydroxy functionality of a linear polyhydric polyether with monocarboxylic acid to produce an hydroxy functional partial ester, reacting a second part of the hydroxy functionality of said partial ester with a polycarboxylic acid monoanhydride, said reaction consuming said anhydride functionality and providing a polycarboxylic intermediate, and then reacting a portion of the carboxyl groups of said polycarboxylic intermediate with a monoepoxide to provide a product having an acid number of from 8 to below 50 and to generate hydroxy functionality remote from the linear backbone of the polyether.

* * * * *

UNITED STATES PATENT OFFICE
CERTIFICATE OF CORRECTION

Patent No. 3,624,013                         Dated November 30, 1971

Inventor(s) Kazys Sekmakas, Edward A. Gauger, Jr., Lester A. Henning

It is certified that error appears in the above-identified patent and that said Letters Patent are hereby corrected as shown below:

Column 1, line 12, "with" should read --which--. Column 1, line 46 "his" should read --this--. Column 4, formula at line 60, and column 13, formula at line 3, at the far right end of the formula, $C{-}\overset{O}{\diagup\diagdown}O$ should read $C{-}\overset{O}{\diagup\diagdown}C$. Column 4, lines 68 and 69, delete "pH which" and insert --alkyl-- Column 5, line 31, "for" should read --of--. The recitation "Note: See the following table:" should be deleted at column 5, following Example 1; column 9, following Example 2; and column 9, following Example 4. Column 8, line 9 "Hass" should read --Haas--. Column 12, line 22, "An" should read --As--.

Signed and sealed this 25th day of July 1972.

(SEAL)
Attest:

EDWARD M. FLETCHER, JR.
Attesting Officer

ROBERT GOTTSCHALK
Commissioner of Patents